United States Patent [19]
Nakai

[11] Patent Number: 6,157,297
[45] Date of Patent: *Dec. 5, 2000

[54] DISPLAY FOR VEHICLE NAVIGATIONAL SYSTEM

[75] Inventor: Noboru Nakai, Iwata, Japan

[73] Assignee: Yamaha Hatsudoki Kabushiki Kaisha, Iwata, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/100,182

[22] Filed: Jun. 19, 1998

[30] Foreign Application Priority Data

Jun. 20, 1997 [JP] Japan ................................... 9-180399

[51] Int. Cl.⁷ ..................................................... B60Q 1/00
[52] U.S. Cl. ........................... 340/461; 340/995; 701/201; 701/211; 701/213
[58] Field of Search .................................. 340/995, 461, 340/990, 466, 988, 425.5, 432, 438; 701/201, 211, 213

[56] References Cited

U.S. PATENT DOCUMENTS

| | | |
|---|---|---|
| 5,351,059 | 9/1994 | Tsuyuki ................................... 342/457 |
| 5,424,953 | 6/1995 | Masumoto et al. ...................... 364/449 |
| 5,459,824 | 10/1995 | Kashiwazaki ............................ 395/131 |
| 5,565,874 | 10/1996 | Rode ........................................ 342/457 |
| 5,739,772 | 4/1998 | Nanba et al. ............................ 340/990 |
| 5,757,268 | 5/1998 | Toffolo et al. ........................... 340/461 |
| 5,758,297 | 5/1998 | Gaultier ..................................... 701/14 |
| 5,764,139 | 6/1998 | Nojima et al. ........................... 340/461 |
| 5,787,383 | 7/1998 | Moroto et al. ........................... 701/210 |
| 5,920,268 | 7/1999 | Toffolo et al. ........................... 340/461 |

*Primary Examiner*—Daniel J. Wu
*Attorney, Agent, or Firm*—Knobbe, Martens, Olson & Bear LLP

[57] ABSTRACT

A navigational system particularly adapted for use with small open vehicles such as a motorcycle. The navigational system includes a display which displays, in addition to vehicle speed and distance traveled, navigational information as to points along a pre-selected course of travel and the distance and turning direction to reach each successive point. The operator may also insert information about each point, such as observations about the point as the name of the point. The display switches from providing a first display condition that provides the travel information and a second condition that permits the insertion of data into the system. The insertion display is not enabled unless the vehicle is in a standing condition and is automatically returned to display operational conditions when the vehicle again moves.

26 Claims, 9 Drawing Sheets

Current Point

Point 1

2.5 Km

Nearing Point 1

Warning

Point 1

200 m

At Point 1

Turn To Left Switch Points

Point 2

4.2 Km

Nearing Point 2

Warning

Point 2

200 m

At Point 2

Turn Right Switch Points

Point 3

1.8 Km

| Memory | Latitude | Longitude | Memo |
|---|---|---|---|
| 1 | N34° 51' 12" | E137° 56' 43" | |
| 2 | N34° 53' 56" | E137° 56' 54" | |
| 3 | N34° 56' 27" | E137° 59' 35" | |

| Memory | Latitude | Longitude | Memo |
|---|---|---|---|
| 1 | N34° 51' 12" | E137° 56' 43" | |
| 2 | N34° 53' 56" | E137° 56' 54" | |
| 3 | N34° 56' 27" | E137° 59' 35" | |

| No. | Date | Time | Latitude | Longitude |
|---|---|---|---|---|
| 1 | 03/27 | 12:00 | N38° 21'18" | E137° 58'49" |
| 2 | 03/27 | 12:30 | N38° 12'51" | E137° 22'38" |
| 3 | 03/27 | 13:00 | N38° 03'32" | E137° 10'29" |

} Data Points Stored At Timed Intervals

| No. | Date | Time | Latitude | Longitude |
|---|---|---|---|---|
| 1 | 03/27 | 11:47 | N38° 21'18" | E137° 58'49" |
| 2 | 03/27 | 12:35 | N38° 12'51" | E137° 22'38" |
| 3 | 03/27 | 15:21 | N38° 03'32" | E137° 10'29" |

} Data Points Recorded On Demand

DISPLAY FOR VEHICLE NAVIGATIONAL SYSTEM

BACKGROUND OF THE INVENTION

This invention relates to a display for a navigational system for vehicles and more particularly to a display for a navigational system for small, relatively open vehicles such as motorcycles.

In recent years, there has been a growing interest for the incorporation in a vehicle of a navigational system. These navigational systems permit the operator to utilize a computer arrangement for selecting a desired destination. The system then may offer alternative routes to that destination and may, at times, determine the best route for the operator to follow from his present location to his desired destination.

These systems obviously have great advantage, but require thoroughly substantial displays inasmuch as they show the routing via a map. The display normally incorporates a color cathode ray tube or a liquid crystal display also having color capabilities.

In addition to the actual display and computer, it is also necessary to provide a device wherein certain input can be received such as maps of various locals so that the computer can select the appropriate courses. Thus, there is a fairly bulky system required in order to achieve these results. In addition, the display must be positioned in a location so that the operator of the vehicle can easily read it.

Although these goals are quite simple to obtain in large vehicles, such as automobiles, other types of vehicles, such as off the road vehicles or motorcycles, do not have the space capability for handling this type of display, particularly when considering the need to display other information to the vehicle operator.

In addition to the navigational information, the rider or operator requires additional information to be displayed for the operation of the vehicle. For example, this may include such other information as vehicle speed, distance traveled, etc. If there is a separate display provided for the navigational information, then there may be little if any space available for this necessary vehicle operational information, if the previous types of navigational displays are employed.

It is, therefore, a principle object of this invention to provide an improved vehicle navigational display that is relatively simple in nature and nevertheless affords the advantages of the more complicated systems frequently employed in other types of vehicles.

It is a further object of this invention to provide an improved and simplified navigational display system for small vehicles like motorcycles wherein the operator may be provided with not only the necessary information to reach a desired destination, but other information necessary for operating the vehicle.

In order to achieve these results, it is proposed to employ a display that has a first portion that displays vehicle operational information and a second portion that displays navigational information. However, the magnitude of information which must be displayed is generally greater than can be handled on a small display. It may be conceivable, therefore, to consider the concept of switching one of the display areas from one type of display to another so as to increase the amount of information that can be read. However, it is desirable under many circumstances to prohibit this switching of the display mode, for example, while the vehicle is being operated. Otherwise, the operator's attention may be directed away from the primary function of operating the vehicle in a safe manner.

It is, therefore, a still further object of this invention to provide a vehicle information display that includes navigational data which may be switched from one condition to another to display additional information, but that the switching is not permitted unless the vehicle is stationary.

SUMMARY OF THE INVENTION

A first feature of the invention is adapted to be embodied in a navigational system for a vehicle that is comprised of a display having two portions. There is also provided an input section for receiving inputted location data for a plurality of locations along a path to be traversed. A sensor is incorporated within the display for sensing the actual location of the display. A control sequentially shows on a first portion of the display the data from the input section as to the next location from the input section and at least the heading to the next location from the sensed location without employing a map in the display. In addition the second portion of the display indicates a vehicle operational condition.

A further feature of the invention is adapted to be embodied in a navigational system display as set forth in the preceding paragraph. In connection with this feature one of the display portions may be switched to display additional navigational information.

A still further feature of the invention is adapted to be embodied in a navigational system display for a vehicle as defined in the preceding paragraph. With this display system, the switching of the one display portion is only possible when the vehicle is stationary.

BRIEF DESCRIPTION OF THE DRAWINGS

FIG. 8 is a graphical view showing how data can be input into the memory and notes added.

FIG. 10 is a block diagram showing how the data may be input to the system in either a time or operator selected mode.

DETAILED DESCRIPTION OF THE PREFERRED EMBODIMENTS

Figure 1:
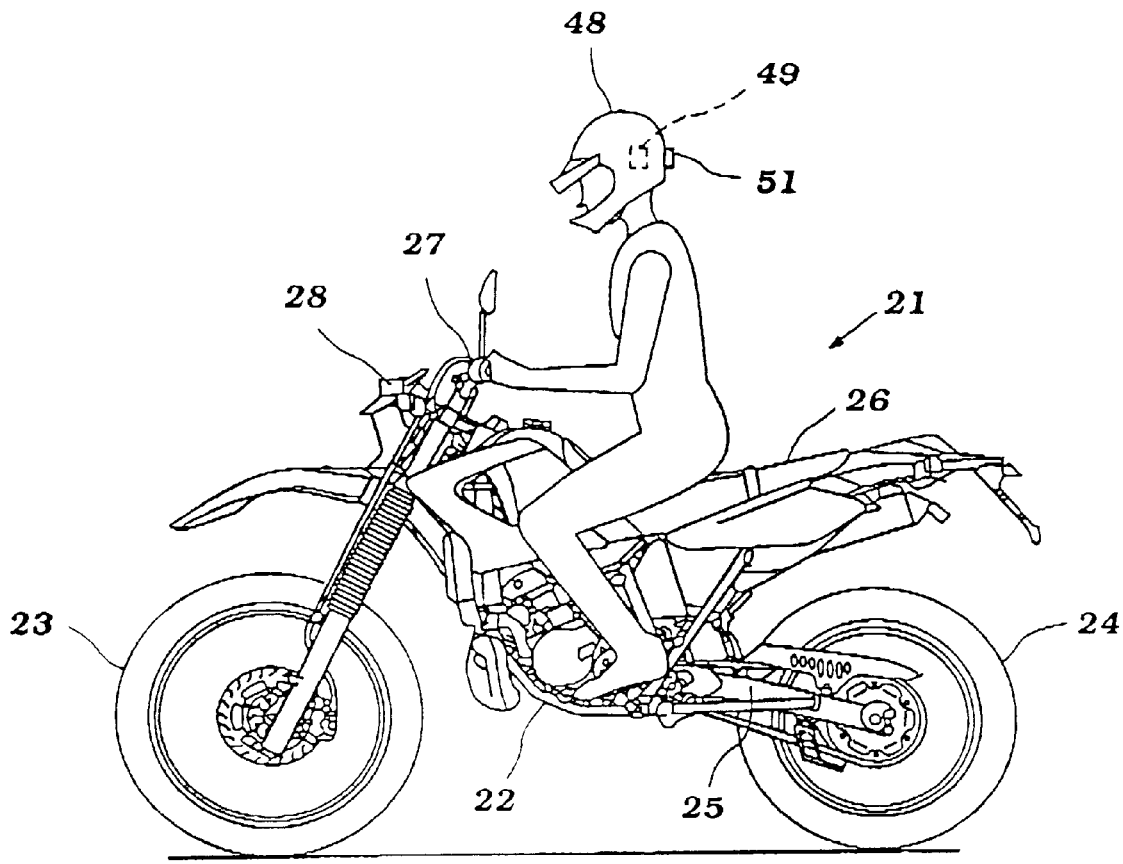
FIG. 1 is a side elevational view of a motorcycle with rider, which motorcycle incorporates a navigational system display arrangement in accordance with an embodiment of the invention.

Referring now in detail to the drawings, FIG. 1 illustrates a motorcycle, indicated generally by the reference numeral 21, as a typical vehicle with which the invention may be utilized. As should be readily apparent from the foregoing description, the invention has particularly utility in connection with a navigational system for small vehicles which are not normally completely enclosed within a body and wherein many of the components including the display may be exposed to the elements. The motorcycle 21 has a frame assembly 22 that dirigibly supports a front wheel 23. In addition, a driven rear wheel 24 is journaled by a suspension arm 25 at the rear of the frame assembly 21. A rider's seat 26 overlies this suspension arm 25 and accommodates a rider who steers the front wheel 23 through a handlebar assembly 27.

The navigational system and associated display which embodies the invention is positioned forwardly of the handlebar assembly 27 and is indicated generally by the reference numeral 28.

Figure 3:
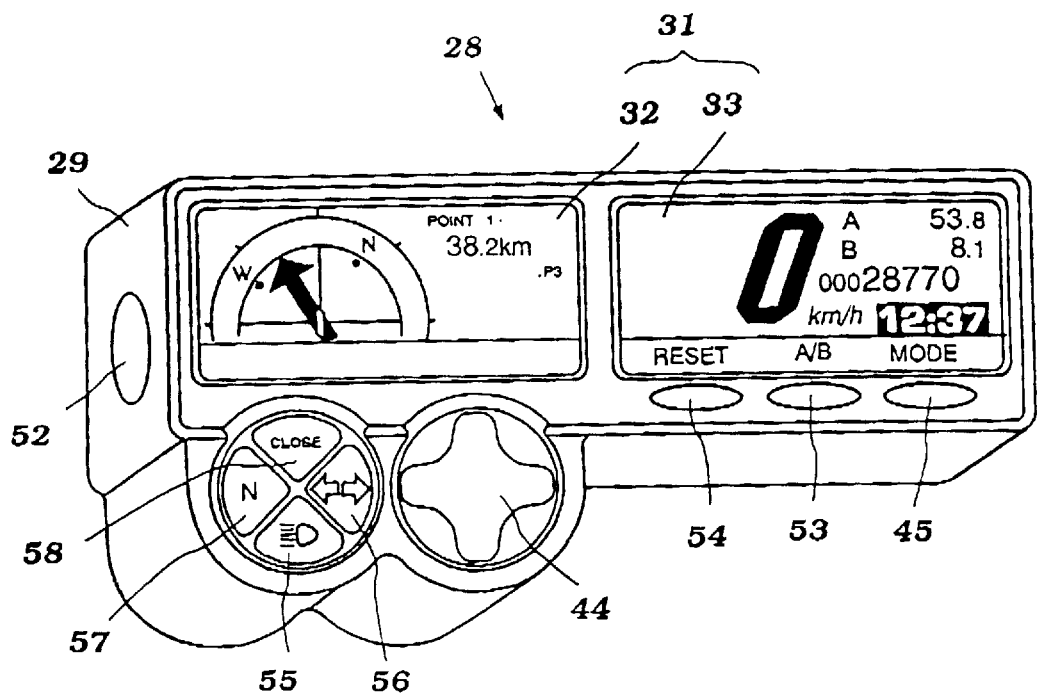
FIG. 3 is a perspective view showing the navigational system and other displays associated with it.
Figure 4:
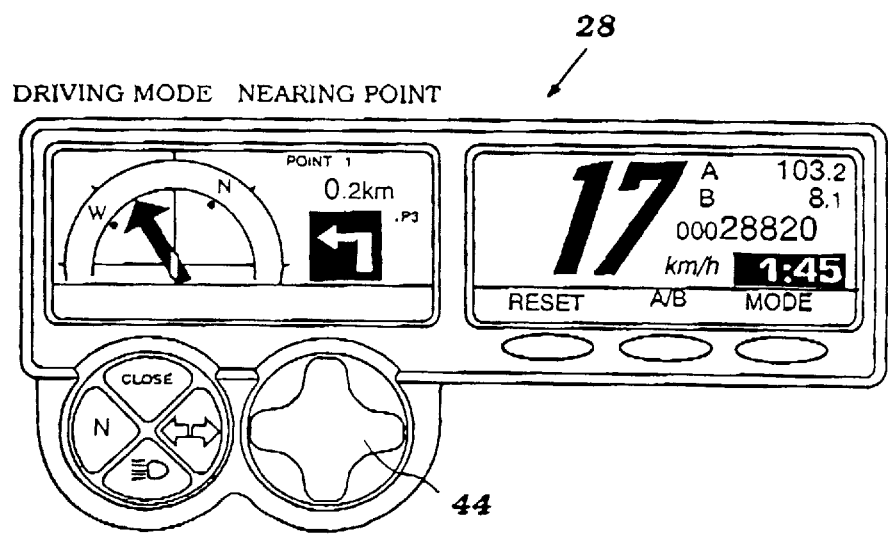
FIG. 4 is a front elevational view of the display showing the condition when approaching a turning point.

The display of the system 28 is shown in more detail in FIGS. 3 and 4 and includes housing assembly 29 that has a display 31 on its rear face which, in this embodiment, comprises a pair of displayed portions 32 and 33. In addition, certain setting and other controls are associated with the housing 29, as will be described later. Although two approximately equal size displays are shown, it is possible to employ only a single display.

The display portion 32 displays navigational information and is always displaying this type of information to the rider, albeit in different forms, as will become apparent. The specific details of this information will be described in more detail later, but basically the information indicates the next point on the journey, the distance to the next point, which is displayed numerically and by way of the arrow, the appropriate heading or azimuth to the next point. Under certain conditions such as when nearing a turning point, for example, the display shifts to the mode shown in FIG. 4 in a manner which will be described so as to alert the rider that a change in direction will be required shortly.

The display 33 shows primarily other vehicle information. In the running mode as shown in FIGS. 3 and 4, the speed is shown digitally and two trip odometers A and B, which can be reset, show trip distances. In addition, there is an overall mileage or odometer reading which is displayed. Furthermore, there is provided a digital clock.

As will be described later, this display section 33 can be switched, under certain circumstances, to display additional, more detailed navigational information and/or to a display which facilitates the showing of the input information and the inputting of information, as will also be described.

Figure 5:
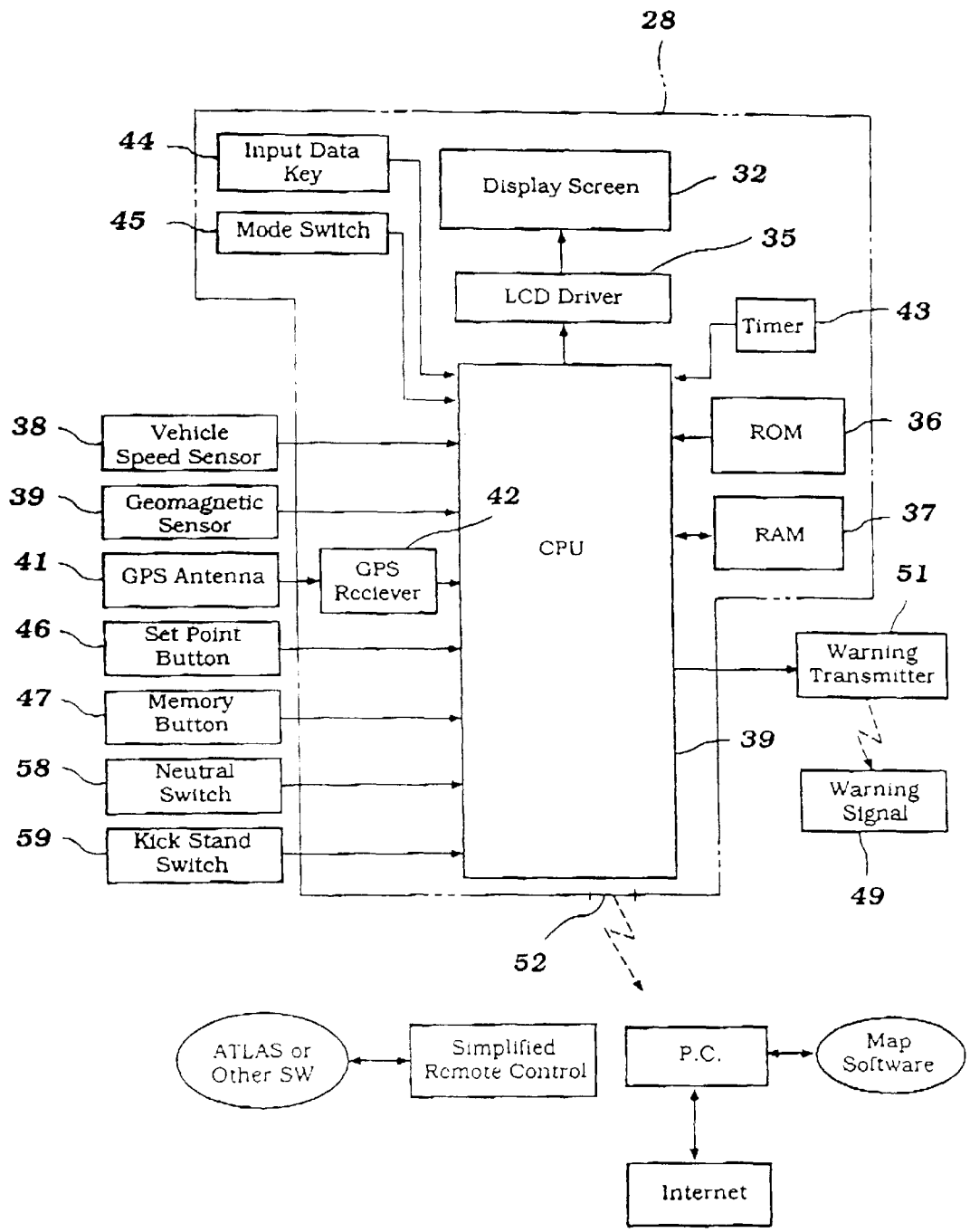
FIG. 5 is a partially schematic block view showing the components of the navigational system and other associated components of the vehicle and how data can be transferred to and from the CPU from and to external sources.

The components of the navigational system 28 are shown in more detail schematically in FIG. 5, and will now be described by particular reference to that figure. This description will also facilitate those skilled in the art to understand how the system operates.

The system 28 is provided with a main CPU 34 that receives certain data and which also drives the display screen 32 through a liquid crystal display driver section 35.

There is provided a read only memory (ROM) that stores data of programs and place names and other fixed information for performing specific calculating functions. This section is indicated by the reference numeral 36.

Also, there is provided a random access memory (RAM) that registers data of points along the route as will also be described.

In order to permit the system to operate so as to calculate speed and distance for driving the speedometers and odometers, there is provided a vehicle speed sensor 38 which may be of any known type, and which outputs its data to the CPU 34.

In addition, a geomagnetic sensor 39 receives magnetic signals from the Earth so as to sense the North Pole condition.

There is also provided a global positioning system (GPS) arrangement that receives satellite data through an antenna 41 which then transmits this data to a receiver 42 so as to provide the CPU 34 with an instantaneous navigational position of the sensor unit 28 and, of course, the associated motorcycle 21.

The clock display and other time functions, as will be noted later, are determined by a timer 43 that inputs a time signal to the CPU 34 so as to perform certain time functions and to indicate the actual time.

There are certain additional switches associated with this system, two of which are included directly in the navigational unit 28. These include an input data key button 44, which the operator depresses when he wishes to input data, as will be described. In addition, there is provided a mode selector switch 45 which is operative to change the display mode of the indicator portion 33.

Figure 2:
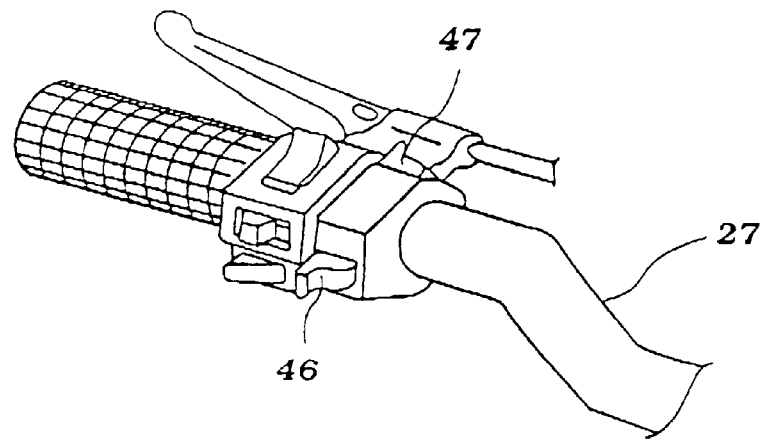
FIG. 2 is a perspective view of one of the hand grips of the motorcycle showing certain of the navigational system controls.

Carried on the handlebar assembly 27 and as also seen in FIG. 2, there are provided two switches that the operator can operate without necessitating his removal from the control of the motorcycle. These include a set point button 46, which, when activated, will perform a function so as to indicate that a point in travel has been passed and switch the display 32 to indicate the next point. Also, there is provided a memory switch 47 that the operator can activate, as will be described later, to store a specific geographic point in the memory of the navigational unit 28.

Although there is a visual display to indicate when the rider should change his position or direction of travel, normal warning signals are not particularly effective in the type of vehicle with which the navigational device 28 is intended to be used. Therefore, the rider's helmet 48 may be provided with a pair of vibrator transducers 49 each associated with a respective side of the rider's head. By changing the magnitude of the vibration signals, the rider can receive a sensory indication of the change in direction which he should make.

That is, if the rider is to execute a sharp left turn, the left vibrator device may be activated while the right hand device can be deactivated. By changing the ratio of activation from one side to the other, the rider can determine the way in which he should turn when he should turn. A receiver 51 is carried by the helmet so as to receive transmitted signals from the CPU 36 so as to activate the vibrators 49 and alert the rider.

Before getting into the detail of the way in which the system operates to provide the navigational information, it should be noted that the housing 29 of the unit 28 is provided with an infrared sensor 52 which is positioned, in a preferred location, on one side or the other of the housing 29. The significance of the side on which the sensor is positioned will be described later by reference to FIGS. 11 and 12.

This infrared window 52 is adapted to receive information which the rider wishes to input as to certain navigational targets. A wide variety of types of devices can be utilized so as to input this information. For example, information may be input externally from an atlas having the longitude and latitude of the various points to be visited and transferred as a batch to the CPU RAM through the infrared sensor 52. Alternatively, a personal computer may be employed that has a program of map software or which can receive information from the Internet so as to determine points along a desired route and these can then be input as a batch through the infrared communication port 52. Obviously, other sources of data can be employed and some of those will be described shortly.

In addition to inputting data, information which the rider has placed into the RAM 37 can be output from the CPU 34 to another machine through the infrared port 52. This also will be described later by reference to FIGS. 14 and 15.

Referring now primarily to FIGS. 3 and 4, certain other components associated with the navigational device 28 and particularly its body assembly will be described. It has been noted that there are provided two trip odometers indicated at A and B, and these odometers can be selected by the switch 53 and reset by a reset switch 54.

There is also provided adjacent the navigational section 32, although other locations are possible, in addition to the input data key 44, certain vehicle indicators, such as a headlight indicator 55, turn signal indicator 56, and neutral condition indicator 57. This neutral condition indicator 57 is operated by a neutral switch 58 (FIG. 5) that senses when the transmission of the motorcycle 21 is in a neutral condition. This neutral switch is also used for another purpose, as will be described.

Finally, there is an indicator light 58 which operates in connection with the position indicator to advise the rider when he is approaching a point when a change in direction or turn should be executed. This condition also causes a switch in the display condition, as seen in FIG. 4. The illustrated example shows that the rider should be prepared to execute a left turn in a close distance such as ⅔oths of a kilometer. The distance at which the warning is given will be varied with speed. The greater the speed, the longer the warning distance. As noted above, the vibrator warning will also be transmitted to the rider's helmet.

Figure 6A:
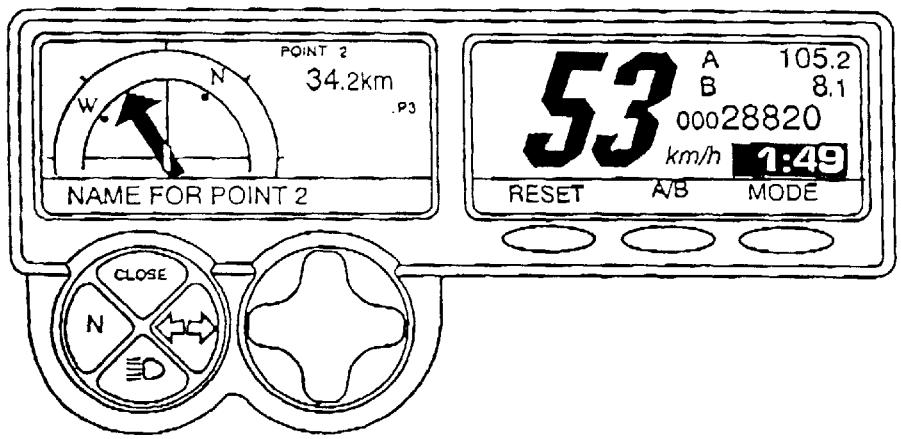
FIG. 6 is a three-part view showing the display in a (A) normal running condition, (B) a navigational, present position condition, and (C) an input data condition.

The various displays afford by the display section 31 will now be described by reference to FIGS. 6 and 7. FIG. 6(A) shows the normal riding mode display. As has been previously noted, in the display section 32, there is provided vehicle information and time, and the indicated condition shows the speed of travel, the two trip odometer readings A and B, the total odometer reading, and the time in a digital form.

The display section 32 displays the navigational data. This permits the indication of the next point on the journey and the distance to the next point. In addition, the heading or azimuth to this point is indicated by the compass arrow.

Furthermore, a name or designation for the previous point which may be inserted by the rider appears at the lower portion of this display. A manner in which the data is input has been mentioned previously, and will be described in some more detail shortly.

Figure 6B:
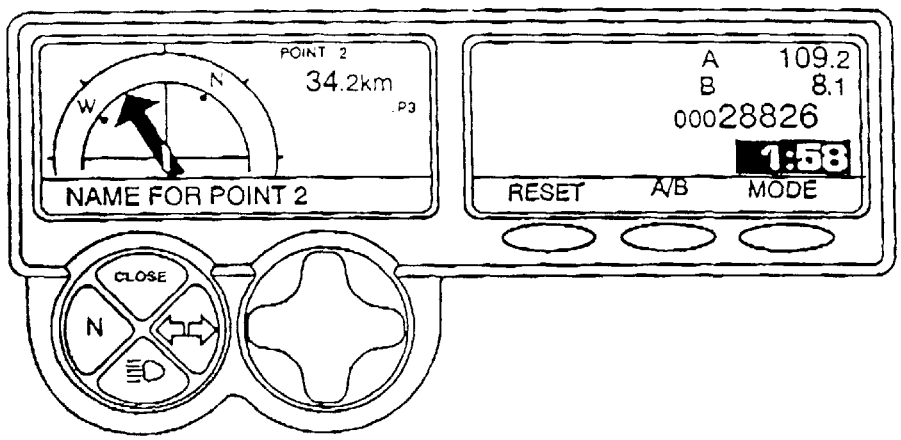

Although the system may be designed so that the operation of the mode selector switch 45 is possible to change from the drive mode display 6(A) to the longitude latitude display mode FIG. 6(B), it is preferable not to permit the operator to select this display mode when the vehicle is operating. Thus, a system maybe incorporated so that the drive mode (A) is displayed automatically when the vehicle is traveling.

This can be determined by sensing the condition of a kick stand switch 59 that senses when the kick stand is extended and also by sensing when the transmission is in neutral by the neutral detector switch 58. The program may be set so as to automatically shift to the longitude latitude display mode FIG. 6(B) at this time.

As seen in this figure, the vehicle speed display disappears and the longitude and latitude at that instant are displayed in its place. Although this is a preferred mode, it can be understood that this instantaneous information also may be displayed simultaneously with the speed during travel by using a smaller display of the speed number.

The final display condition is shown in FIG. (6) and this is one that can only be engaged by the rider by operating the mode change switch and when the vehicle is stationary as determined by the neutral switch 58 and the kick stand switch 59 in the manner previously described.

In this condition, the operator may see the various set points along the trip, indicate the directions at which turns should be made on the trip, and also enter observational data such as interesting points of observation, rest stops, machine shop facilities, and other such information. This can all be entered through a suitable keyboard or by using the various switches or keys already provided on the system.

The various navigational points to be inserted can include various intersections in the road where several roads cross and the direction that the rider should turn at those points. This can be either indicated manually by the rider, or can be fed in from external sources as previously noted. These can be transmitted from a map or computer program. Furthermore, during travel, the rider may input data in a manner which will be described shortly. These added roads appear in the parentheses in FIG. 7

As a further point of information, it should be noted that the point indication on travel which appears at the left hand side or in the display portion 32 does not automatically change when the next point has been reached. Rather, this system preferably requires the operator to press the switch 46 to reset the point to the next point.

This is done so that if the rider misses a point, he will still be able to go back and find his way since the azimuth indicator will be correct when he turns the vehicle around. That is, the system automatically compensates when a point has been missed.

Figure 6C:
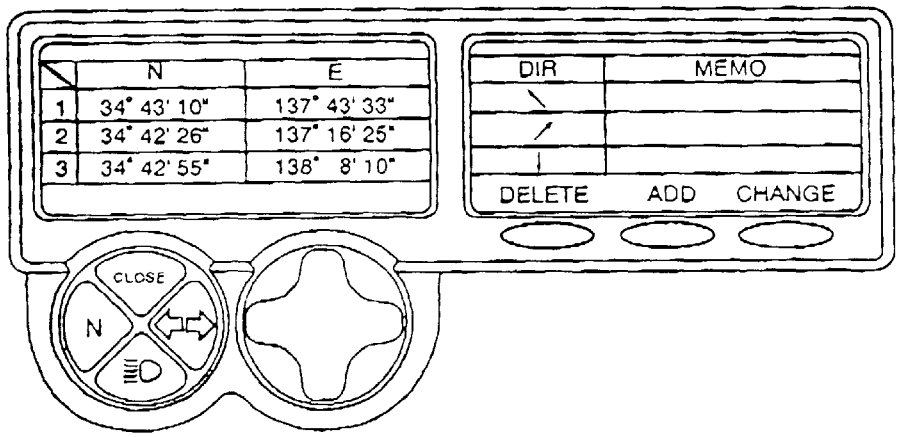

Also it should be noted that if the indicator is in the condition shown in FIG. 6(C) to enter information, when the rider begins to operate the motorcycle again, it will shift to the drive mode 6(A) automatically.

Figure 7:
FIG. 7 is a view showing how the display changes during travel.
Figure 7:
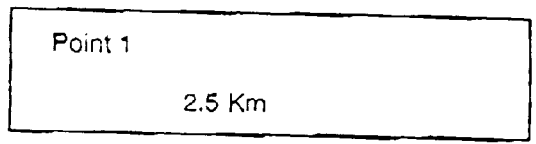
Figure 7:
Figure 7:
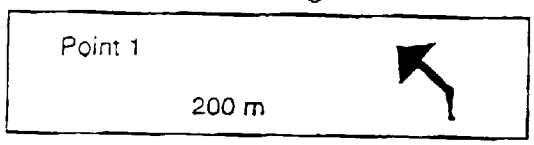
Figure 7:
Figure 7:
Figure 7:
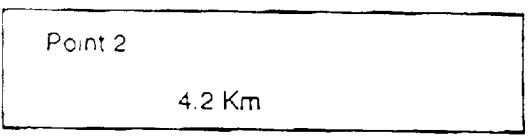
Figure 7:
Figure 7:
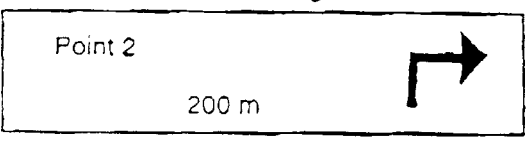
Figure 7:
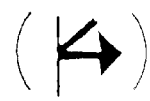
Figure 7:
Figure 7:
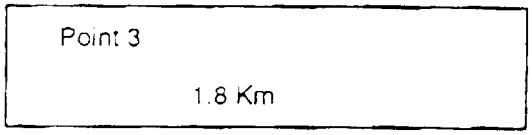

The manner in which the navigational information in the display 32 is changed as the vehicle, or specifically, the motorcycle 21, travels along its path can be best understood by reference to FIG. 7. This figure shows the display portion indicating the next checkpoint, beginning from the instantaneous position and the distance to the next checkpoint. In the specific example illustrated, the rider is at the point I and is 2½ kilometers from the next point, point 1. The display at the lower portion can also have the name of the instantaneous or last point shown if the operator has added that information under the Memo section of the display, as seen in FIG. 6(C).

As the operator approaches the next checkpoint, point 1, in this example, the display continues to show the distance to the next checkpoint. In this particular instance, the next checkpoint is a point where the change of direction occurs, and this normally is at an intersection.

As seen in parenthesis to the right of the second block in this figure, the operator may have inserted data to show that there is a multi-road intersection, and rather than just a turn at this point. This can be optional.

As the point 2 is approached, the light 58 will flash, and also the audible or vibrator warning of signals by the vibrators 49 will be given. In the illustrated embodiment, there will be a signal from the left ear which is louder, and a signal from the right ear which is weaker. This will indicate that the turn should be to the left, but not a 90° turn.

After having passed the checkpoint, the operator should press the handlebar switch 46 to advance the indicator to the next point. The display will then change, as shown in the third block, to indicate that the point 1 has been passed and there is 4.2 kilometers to the next checkpoint 2.

It should be noted that each time the vehicle approaches a point on the route, the vehicle direction at that time point is detected by the geomagnetic sensor 39, and this information is compared with the actual driving direction. If there is a difference, the previously inputted absolute azimuth of the driving direction is corrected. Also, corrections will be made in the directions for following turns.

As the rider continues on, the next checkpoint comes up, and again, he will be given a warning, make the change in direction at the appropriate time, and then advance the point setting.

By permitting the operator to make these settings merely by pressing the button on the handlebar 27, he need not remove his hands from the controls, and also, his attention from the road will not be disturbed when updating the data.

Because of the way the data is input and displayed, if the operator misses a turn and must turn around, or if he approaches the point from a different direction due to some other deviation, since the geomagnetic sensor cooperates with the azimuth reading, it will be insured that his directions will always be proper and appropriate.

Although the system has been described with a requirement that the operator manually advise the system 28 that a checkpoint has been reached and passed, it also is possible to utilize automatic switching. This may have some disadvantages. For example, if the operator makes an intentional detour around a point on the route, the route guidance will thereafter become inoperative. Also, the driver may overlook when the vehicle has passed the current point on the route. In the case of manual operation, the direction indicating arrow turns in the opposite direction upon passing the current point, and this will be immediately noticed by the rider. With an automatic system, however, if the rider has inadvertently passed the point and turns back, then the route guidance for the next point may have started, and the system will give incorrect information.

The system has been described in conjunction with arrangements wherein the preset points for the navigational system are programmed in through a personal computer or some external control system. However, the device also permits a rider to select a route which he may wish to travel again while actually traversing that route.

The way this is done is that the rider will ride to a location which he finds of particular interest, either from a scenery standpoint or to get to a specific location. He then can enter data manually as to the specific location. The way this is done is that he must first stop the motorcycle, shift the transmission into neutral, and set the motorcycle on the kick stand. Only then can he operate the mode switch so as to create the display shown in FIG. 6(C).

Figures 8A, 8B, 9, 10A, 10B:
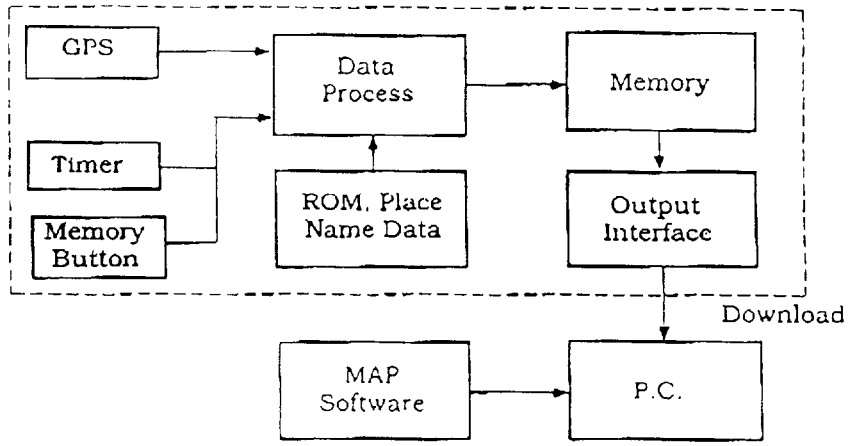
FIG. 9 is a partially schematic block diagram showing the relationship of certain of the components in connection with the navigational system during data transfer.

When he reaches this display mode, he may then delete existing data or add a new data. FIG. 8(A) shows how such new data can be entered. That is, if the operator wants to make a particular notation of a particular place, he need merely read the latitude and longitude for that place and enter it, or have the device enter it automatically by pressing the memory button at that particular location. The operator then need not switch the display back to the drive mode.

However, when he either retracts the kick stand and/or shifts the transmission from neutral, the display mode 6(A) will resume. The rider may then move to the next point along his chosen path of travel and enter such appropriate information at those points so as to accumulate data for a new trip.

As another alternative, the data can be programmed to memorize certain data along a trip at fixed time intervals. FIG. 9 shows an interface arrangement for doing that, and FIG. 10 in Group A shows how the data would appear when stored. The system can operate so as to permit the taking of location data at fixed time intervals, and an interval of every half-hour is shown in FIG. 10a. Thus, the rider rides along, and at every half-hour interval, a reading of location is taken. This data is stored in the memory, and the rider may then add memo data later when stopped.

Alternatively, the operator may take this data while he is riding. He can ride along a path, and at times that he chooses, press the memory switch or button 47 on the handlebar assembly, without removing his hands. Then the data is stored as shown in FIG. 10, wherein the time at which the rider pressed the memory button and the latitude and longitude at that point then will be recorded. After completing his trip, the rider may then make such edits as he wishes in the memo section. In this mode, the rider need not remove his hands from the control, nor need he look at any display. Thus, he is able to maintain this data, or collect this data and edit it later as he sees fit.

Also, because of the inclusion of the timer, it is possible for the rider to see average speed and other data.

Figure 11:
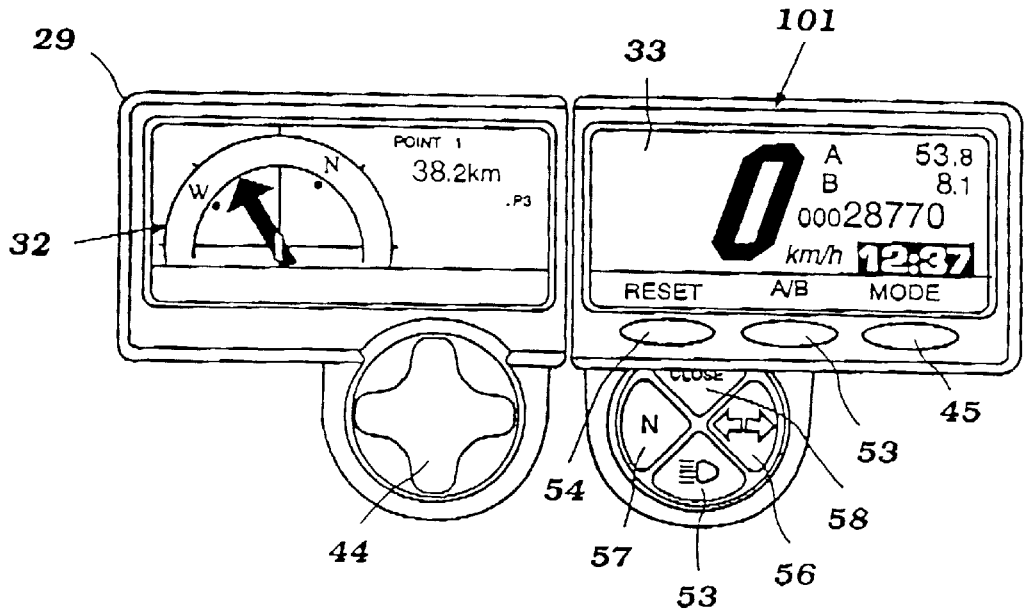
FIG. 11 is a view, in part similar to FIG. 4, but shows another embodiment wherein the navigational system can be employed in connection with a conventional type of speedometer arrangement.

In the embodiment of the invention as thus far described, the unit 28 has been a unitary unit contained within a single outer housing 29. FIG. 11 shows an embodiment which is slightly different and lends itself more to the vehicle manufacturer being sable to offer the navigational device as optional equipment while maintaining a conventional type of speedometer, shown at the right hand side and identified generally by the reference numeral 101. This speedometer 101 has the display 33 of the previously noted type and includes the buttons 54, 53 and 45. These function normally as with the previously described in connection with the conventional type of speedometer control.

In this embodiment, the close indicator 58 can be a dummy indicator when the device operates only as a speedometer and the navigational system is not employed. However, when the navigational system is employed, it can be activated in a suitable manner.

In this embodiment, the navigational screen 32 and the navigational control system is contained within a single housing 29 and displays the same type of information as the previous screen. In this embodiment, the set switch 44 is contained on this housing.

With this embodiment, the speed display 33 is not switched to display any navigational information during the alternate modes. All of this information will be displayed on the screen 32.

Figure 12:
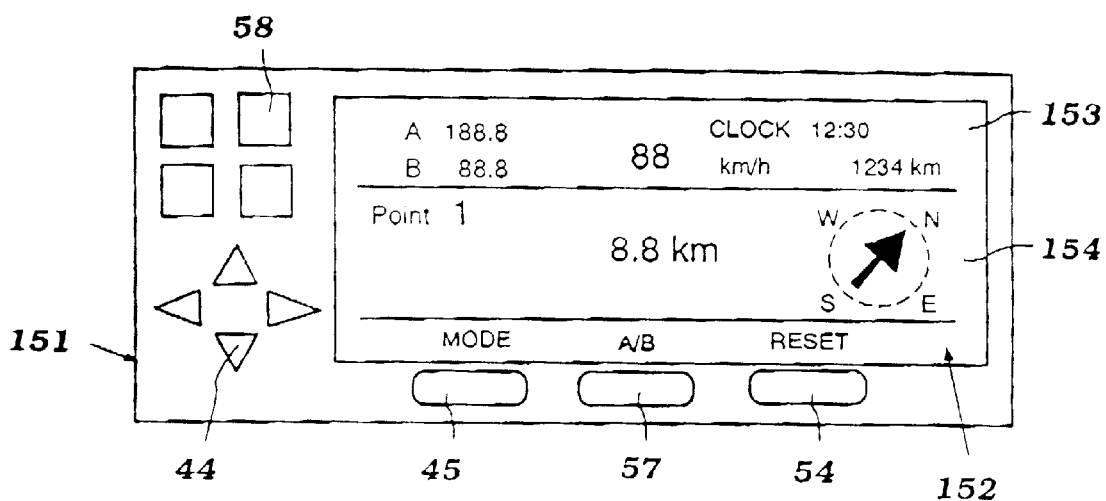
FIG. 12 is a view, in part similar to FIGS. 4 and 11, and shows another embodiment of the invention using a single display.
Figure 13A:
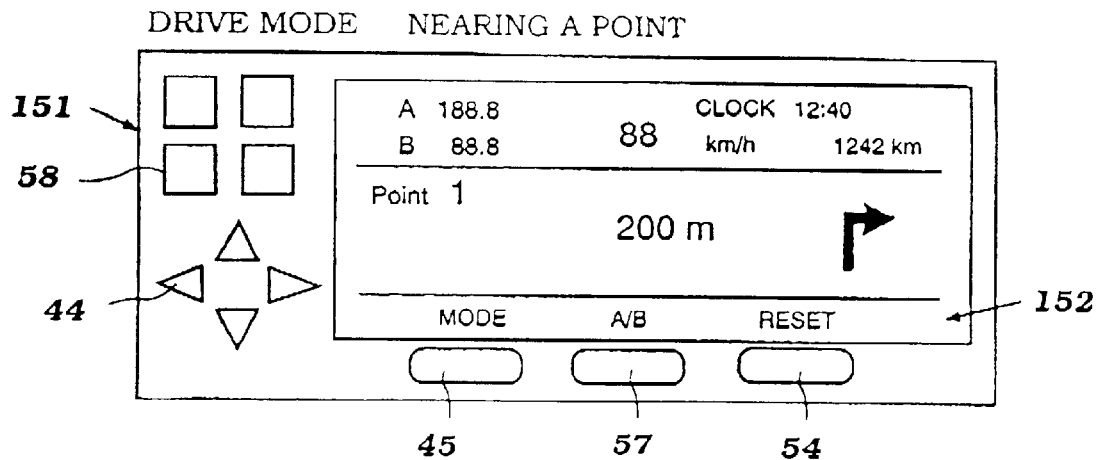
FIG. 13 is a three part view, in part similar to FIG. 6, and shows the varying modes for this embodiment corresponding to those of the previous embodiment.
Figure 13B:
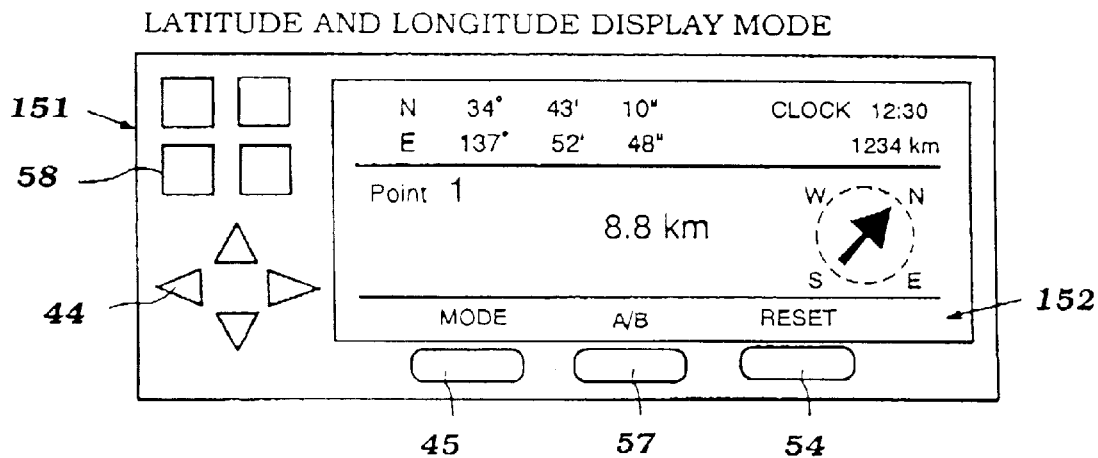
Figure 13C:
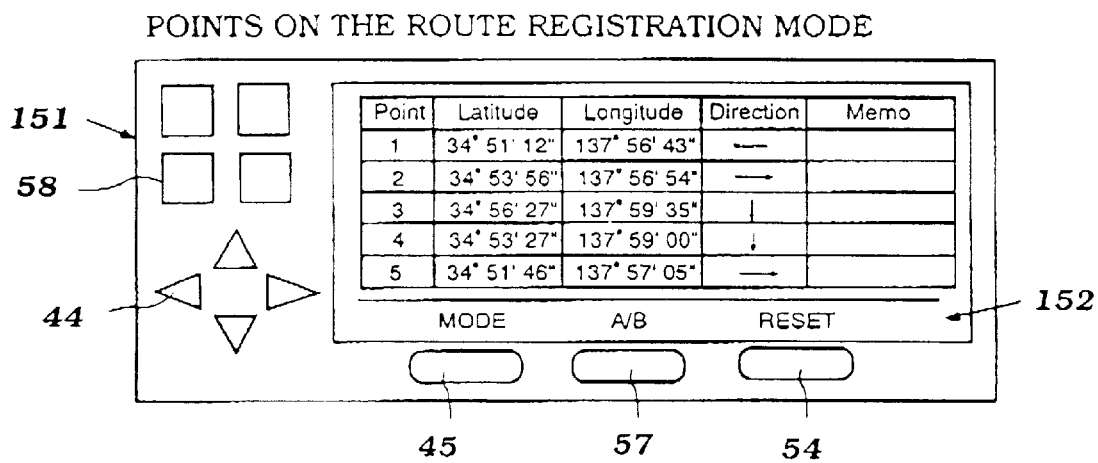

It has been previously noted that in addition to two separate display sections, the invention can be also utilized in an arrangement wherein there is a single display that is split under some conditions. FIGS. 12–13 show such an embodiment, and this embodiment is indicated generally by the reference numeral 151. The various switches and infrared sensors are the same, but are mounted in slightly different positions on the common housing of this unit. Because of their similarity of function to that previously described, these switches and indicators have been identified by the same reference numerals and will not be described again, except insofar as is necessary to understand the construction and operation of this embodiment.

In this embodiment, there is provided a single display screen 152 which is divided, under certain conditions, as to be described, into an upper portion 153 which displays the speed, time, and distance information as in the display sections 33 of the previous embodiments. In addition, there is provided a lower display screen portion 154 that displays the navigational information provided by the screens 32 of the previous embodiment.

In this embodiment, the navigational information is displayed in the same manner previously described on the various screen portions. This is shown in FIG. 12 and FIGS. 13(A) and (B). However, when in the registration mode, FIG. 13 (C), the entire screen shifts to this mode rather than being split as with the previous embodiment. In all other regards, this embodiment is the same as those previously described and, therefore, further description is not believed to be necessary to permit those skilled in the art to practice the invention.

Figure 14:
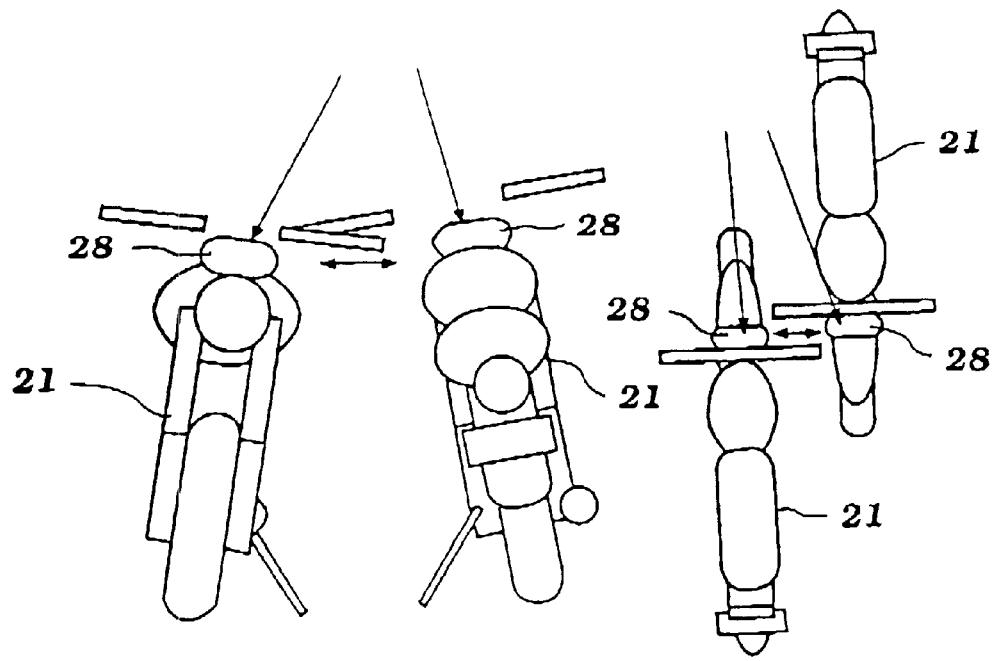
FIG. 14 is a rear and top plan view of an embodiment showing how data can be interchanged between two motorcycles in accordance with one embodiment of the invention.
Figure 15:
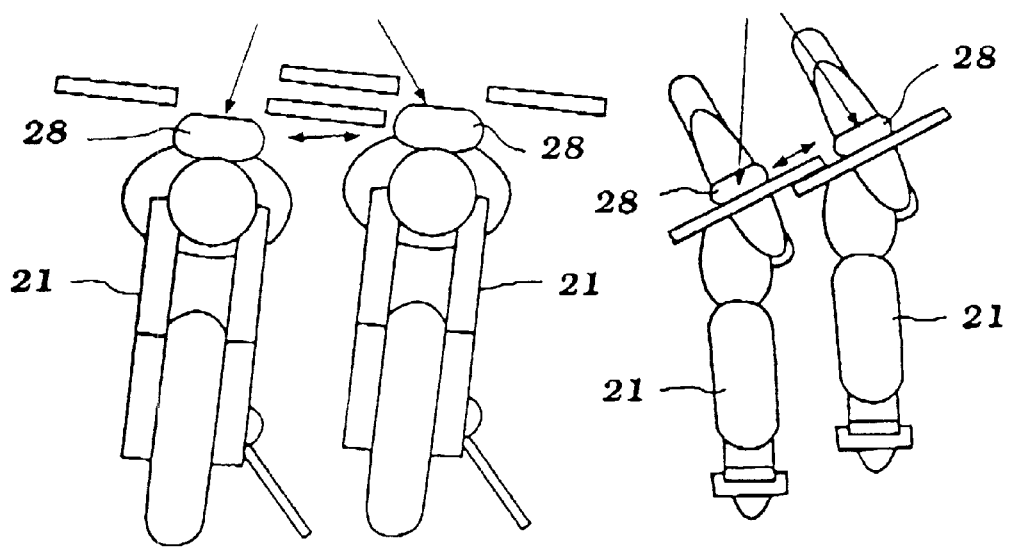
FIG. 15 is a side and top plan view showing another embodiment arrangement for exchanging information between two motorcycles.

As has been previously noted, the infrared sensor 52 not only can receive data, but can send data. FIGS. 14 and 15 show two different embodiments, wherein the data can be transferred from one motorcycle to another. Thus, if a rider has taken a particularly interesting ride or has recorded directions to get from one place to another and wishes to share that information with another rider, the data can be transferred between the two units by their infrared sensors 52.

It has been previously noted that the sensor 52 is preferably placed on one side of the control housing 29. FIG. 14 shows an arrangement wherein there is a left-hand drive, and in this situation, the sensors 52 are placed on the left-hand side of the housing 29. Thus, when the motorcycles are at rest on kick stands and reversed relative to each other, there respective sensors 52 will be in registry, and data can be exchanged, as shown in FIG. 14. If there is a right-hand drive, then the opposite side location can be chosen.

FIG. 15 shows an arrangement wherein there are sensors on both sides, and this permits the motorcycles to be placed in side-by-side fashion and facing in the same direction, so as to transmit data.

Thus, it should be readily apparent from the foregoing description that the disclosed system provides a very simple yet highly effective navigational system display that is particularly adapted for use on vehicles that do not have the size and space accommodations of larger vehicles such as automobiles. Also, because no external wiring is required to transfer data, the system can withstand the elements without damage.

Of course, the foregoing description is of preferred embodiments of the invention, and various changes and modifications can be made without departing from the spirit and scope of the invention, as defined by the appended claims.

What is claims is:

1. A navigational system display adapted to be mounted at least in part contiguous to the steering handlebar of a small, generally open vehicle having at least one dirigible wheel steered by said handlebar with said display positioned in proximity to said handlebar, said display being comprised of an input section adapted to be mounted in front of the vehicle operator for receiving input location data for a plurality of sequential locations, a sensor for sensing the actual location of said display, a control sequentially shows on a first portion of said display the data from the input section as to the next location from the input section and at least the heading to the next location from the sensed location without employing a map in the display, a second portion of said display indicating a vehicle operational condition, and means for shifting the display of one of said display portions from a first display condition to a to a second display condition to display additional navigational information.

2. A navigational system display and indicating instrument adapted for mounting at least in part contiguous to the steering handlebar of a small, generally open vehicle having at least one dirigible wheel steered by said handlebar with said display positioned in proximity to said handlebar, said display and indicating instrument comprised of an input section for receiving input location data for a plurality of sequential geographical locations, a sensor for sensing the actual geographical location of said display, a control sequentially shows on a first portion of said display the data from the input section as to the next location from the input section and at least the heading to the next location from the sensed location without employing a map in the display, and a second portion of said display indicating a vehicle operational condition that varies independently of the navigational condition of the vehicle.

3. A navigational system display as set forth in claim 1 wherein the display first portion also displays the distance to the next location calculated from the distance traveled from the previous location.

4. A navigational system display for a vehicle as set forth in claim 1 wherein the first and second display portions are formed by a common screen.

5. A navigational system display for a vehicle as set forth in claim 1 wherein the first and second display portions are formed by separate screens.

6. A navigational system display for a vehicle as set forth in claim 5 wherein the separate screens are contained in a common housing.

7. A navigational system display adapted for mounting at least in part contiguous to the steering handlebar of a small, generally open vehicle having at least one dirigible wheel steered by said handlebar with said display positioned in proximity to said handlebar in front of the operator thereof, said display being comprised of an input section for receiving input location data for a plurality of sequential locations, a sensor for sensing the actual location of said display, a control sequentially shows on a first portion of said display the data from the input section as to the next location from the input section and at least the heading to the next location from the sensed location without employing a map in the display, a second portion of said display indicating a vehicle operational condition, and means for shifting the display of said second portion from the display of vehicle operation to display navigational information in addition to that shown by said first portion.

8. A navigational system display for a vehicle as set forth in claim 7 wherein the second display portion displays vehicle speed when in its first condition.

9. A navigational system display for a vehicle as set forth in claim 8 wherein the second display portion displays instantaneous vehicle location when in its second condition.

10. A navigational system display for a vehicle as set forth in claim 7 wherein the first display portion may also be shifted from a first display condition to a second display condition to display additional navigational information.

11. A navigational system display for a vehicle as set forth in claim 10 wherein the second display portion is be shifted to a third display condition when the first display portion is shifted from a first display condition to a second display condition to display still additional navigational information.

12. A navigational system display for a vehicle comprised of a display, an input section for receiving input location data for a plurality of sequential locations, a sensor for sensing the actual location of said display, a control for sequentially showing on a first portion of said display the data from the input section as to the next location from the input section and at least the heading to the next location from the sensed, a second portion of said display indicating a vehicle operational condition, means shifting the display of one of said display portions from a first display condition to a second display condition to display additional navigational information, and means for precluding the shifting of the display of said one of the display portions from said first display condition to said second display condition if the vehicle is not stationary.

13. A navigational system display for a vehicle as set forth in claim 12 wherein the vehicle is sensed to be stationary by the condition of a transmission of the vehicle.

14. A navigational system display for a vehicle as set forth in claim 12 wherein the display of the one of the display portions is returned to the first display condition when the vehicle is no longer stationary.

15. A navigational system display for a vehicle as set forth in claim 12 wherein the first and second display portions are formed by a common screen.

16. A navigational system display for a vehicle as set forth in claim 12 wherein the first and second display portions are formed by separate screens.

17. A navigational system display for a vehicle as set forth in claim 16 wherein the separate screens are contained in a common housing.

18. A navigational system display for a vehicle as set forth in claim 12 wherein the vehicle comprises a motorcycle and wherein the display input section, sensor and control are mounted as a unit adjacent to the handlebars thereof.

19. A navigational system display for a vehicle as set forth in claim 18 wherein the motorcycle has a kick stand the motorcycle is sensed to be stationary when said kick stand is extended.

20. A navigational system display for a vehicle as set forth in claim 19 wherein the display of the one of the display portions is returned to the first display condition when the kick stand is retracted.

21. A navigational system display for a vehicle comprised of an input section for receiving input location data for a plurality of sequential locations, a sensor for sensing the actual location of said display, a control sequentially shows on a first portion of said display the data from the input section as to the next location from the input section and at least the heading to the next location from the sensed location without employing a map in the display, a second portion of said display indicating a vehicle operational condition, and means for shifting the display of one of said display portions from a first display condition to a to a second display condition to display additional navigational information only when said vehicle is stationary.

22. A navigational system display for a vehicle as set forth in claim 21 wherein the vehicle is sensed to be stationary by the condition of a transmission of the vehicle.

23. A navigational system display for a vehicle as set forth in claim 22 wherein the display of the one of the display portions is returned to the first display condition when the vehicle is no longer stationary.

24. A navigational system display for a vehicle as set forth in claim 21 wherein the vehicle comprises a motorcycle and wherein the display input section, sensor and control are mounted as a unit adjacent to the handlebars thereof.

25. A navigational system display for a vehicle as set forth in claim 24 wherein the motorcycle has a kick stand the motorcycle is sensed to be stationary when said kick stand is extended.

26. A navigational system display for a vehicle as set forth in claim 25 wherein the display of the one of the display portions is returned to the first display condition when the kick stand is retracted.

\* \* \* \* \*